United States Patent
Wittmer et al.

(10) Patent No.: US 8,798,930 B2
(45) Date of Patent: Aug. 5, 2014

(54) METHOD FOR SERVICING A FIELD DEVICE OF PROCESS AUTOMATION TECHNOLOGY HAVING AT LEAST TWO MEASUREMENT CHANNELS AND FIELD DEVICE OF PROCESS AUTOMATION TECHNOLOGY HAVING AT LEAST TWO MEASUREMENT CHANNELS AND BEING SUITABLE FOR PERFORMING THE METHOD

(75) Inventors: Detlev Wittmer, Maulbronn (DE); Stefan Robl, Gerlingen (DE); Wolfgang Babel, Weil der Stadt (DE)

(73) Assignee: Endress + Hauser Conducta Gesellschaft für Mess- und Regeltechnik mbH + Co. KG, Gerlingen (DE)

( * ) Notice: Subject to any disclaimer, the term of this patent is extended or adjusted under 35 U.S.C. 154(b) by 455 days.

(21) Appl. No.: 12/733,253

(22) PCT Filed: Aug. 8, 2008

(86) PCT No.: PCT/EP2008/060429
§ 371 (c)(1),
(2), (4) Date: Jun. 27, 2011

(87) PCT Pub. No.: WO2009/024481
PCT Pub. Date: Feb. 26, 2009

(65) Prior Publication Data
US 2011/0251792 A1    Oct. 13, 2011

(51) Int. Cl.
*G06F 19/00* (2011.01)
(52) U.S. Cl.
USPC ............................................. 702/1

(58) Field of Classification Search
USPC .............................................. 702/1
See application file for complete search history.

(56) References Cited

U.S. PATENT DOCUMENTS

| | | | |
|---|---|---|---|
| 6,373,848 B1 | 4/2002 | Allison | |
| 6,574,515 B1 | 6/2003 | Kirkpatrick | |
| 8,626,087 B2 * | 1/2014 | Vanderaa | 455/90.3 |
| 2002/0018487 A1 * | 2/2002 | Chen et al. | 370/465 |
| 2003/0236937 A1 * | 12/2003 | Barros De Almeida et al. | 710/305 |
| 2006/0206218 A1 | 9/2006 | Glanzer | |

FOREIGN PATENT DOCUMENTS

| | | |
|---|---|---|
| DE | 1030765 | 5/1958 |
| DE | 101 47 706 | 4/2003 |
| DE | 102 34 304 | 2/2004 |
| DE | 102 45 176 | 4/2004 |
| DE | 103 07 650 | 9/2004 |

OTHER PUBLICATIONS

English translation of the International Preliminary Examination Report.

* cited by examiner

*Primary Examiner* — Aditya Bhat
(74) *Attorney, Agent, or Firm* — Bacon & Thomas, PLLC

(57) ABSTRACT

In a method for servicing a field device of process automation technology having at least two measurement channels, with the assistance of an external service unit, separate device descriptions are provided in the service unit for the measurement channels. The individual measurement channels can be invoked on the service unit via the corresponding device descriptions as logical units, so that, in servicing, the field device appears to the user as at least two logically independent field devices.

8 Claims, 3 Drawing Sheets

METHOD FOR SERVICING A FIELD DEVICE OF PROCESS AUTOMATION TECHNOLOGY HAVING AT LEAST TWO MEASUREMENT CHANNELS AND FIELD DEVICE OF PROCESS AUTOMATION TECHNOLOGY HAVING AT LEAST TWO MEASUREMENT CHANNELS AND BEING SUITABLE FOR PERFORMING THE METHOD

CROSS REFERENCE TO RELATED APPLICATIONS

This application is a national stage application of international application No. PCT/EP2008/060429 filed Aug. 8, 2009, which claims the benefit of earlier filed German application No. 10 2007 039 529.0, filed Aug. 21, 2007.

TECHNICAL FIELD

The invention relates to a method for servicing a field device of process automation technology having at least two measurement channels, and to a field device of process automation technology having at least two measurement channels and being suitable for performing the method.

BACKGROUND DISCUSSION

In process automation technology, field devices are often applied, which serve for registering a process variable. Examples of such field devices are fill level measuring devices, flow measuring devices, pressure, or temperature, measuring devices, etc., which register the corresponding process variables, fill level, flow, pressure or temperature.

A large number of such field devices are manufactured and sold by the firm, Endress+Hauser.

Field devices are composed, as a rule, of a measurement transmitter and a sensor. The sensor essentially transduces the process variable into an analog, electrical signal. The actual measured value is produced in the measurement transmitter. Most often, there is in the measurement transmitter also a further processing of the raw, measured value delivered by the sensor. Thus, non-linear behavior of the sensor can be compensated in the measurement transmitter e.g. via a linearizing function.

The measured values are, as a rule, forwarded via the measurement transmitter to controllers (PLC-units), which control or monitor a process.

The forwarding of the measured values occurs in the case of modern field devices no longer in an analog manner via a 4-20 mA current loop, but, instead, digitally via a fieldbus.

Modern field devices, therefore, have a fieldbus interface, via which a bidirectional, digital communication is enabled via the fieldbus. Such field devices are very complex and must be configured and parametered at start-up and also during operation.

Known for this are corresponding operating tools (e.g. the FieldCare product of the firm, Endress+Hauser), which work with devices of multiple manufacturers.

In order to make known to the operating tools the functionality of the different field devices, standardized device descriptions are necessary, which, normally, are provided by the field device manufacturers.

Examples of such device descriptions are HART-, Profi-bus-, Foundation Fieldbus—device descriptions. Also known are DTMs (Device Type Managers) in the form of executable device descriptions according to the FDT standard.

For each field device, therefore, a corresponding device description must be created, before it can be integrated into an operating tool.

Already in the case of typical field devices with only a single sensor, the creation of the device descriptions is very complicated due to the large number of adjustable parameters (sometimes over 500) and their interdependencies.

Especially in analytical technology, frequently field devices are applied, which are composed of a measurement transmitter having a plurality of connected sensors. One speaks in the case of these field devices also in terms of multi-channel field devices. Associated with each measurement channel, in such case, is a certain sensor.

Typical sensors applied in analytical technology are pH-, conductivity-, and oxygen sensors.

In the case of a field device with four measurement channels, it is evident that there are 20 different possible sensor combinations. Each sensor combination is to be viewed as an individual field device, for which, therefore, its own device description must be created.

As a rule, device descriptions are produced by the device manufacturer and must be maintained by the manufacturer. The more device descriptions a device manufacturer offers, the greater is the development and maintenance effort.

For the user, the servicing of such a multi-channel, field device, i.e. a field device having at least two measurement channels, is complicated, since the user requires the suitable device description for the particular sensor combination.

On the whole, the servicing of field devices of process automation technology having at least two measurement channels is very complicated.

SUMMARY OF THE INVENTION

An object of the invention is, therefore, to provide a method for servicing a field device of process automation technology having at least two measurement channels, which method does not have the above named disadvantages, while being, at the same time, especially simple and cost effective to implement.

This object is achieved by a method for servicing a field device of process automation technology having at least two measurement channels, with the assistance of an external service unit, characterized in that separate device descriptions for the measurement channels are provided in the service unit and the individual measurement channels are invoked at the service unit via their corresponding device descriptions as logical units, so that, in the servicing, the field device appears for the user as at least two logically independent field devices. Because each measurement channel is assigned a separate device description, fewer device descriptions need to be created for multi-channel field devices. This means a smaller effort for field device manufacturers in the producing of device descriptions and a simplifying of the servicing for the user.

Another object of the invention is to provide a field device of process automation technology having at least two measurement channels, which field device can be serviced simply, as well as being simple and cost effective in construction.

This object is achieved by a field device of process automation technology, comprising: at least two measurement channels, wherein each measurement channel has a sensor for registering a process variable and a program module running in a microcontroller for processing the measured value; and, for connection to a fieldbus, a single fieldbus interface, which is connected with the microcontroller, characterized in that the fieldbus interface has at least two communication controllers, which have different fieldbus addresses, and wherein each communication controller exchanges data with one measurement channel.

Because the field device has a fieldbus interface with a plurality of communication controllers, which are associated with different fieldbus addresses, the field device appears to the fieldbus as a number of logically independent field devices. Therewith, each of the logical field devices can be serviced by means of a separate device description.

According to a further development, the invention is, above all, suitable for device descriptions according to the fieldbus standard, HART, Profibus or Foundation Fieldbus, as well as for DTMs according to the FDT standard.

The field device can be serviced simply both via the fieldbus, as well as also via an internal, service interface provided on the field device.

For simple servicing of the field device, according to a further development, in the case of a bus scan, the measurement channels appear as separate field devices to the service unit.

In a further development of the invention, the at least two communication controllers provided in the fieldbus interface are implemented by way of software on a communication main controller. In this way, a high flexibility is achieved.

The fieldbus interface includes, according to a further development of the invention, a configurable logic chip, on which the communication controllers, or the communication main controller, are/is implemented. In this way, flexibility is further increased.

BRIEF DESCRIPTION OF THE DRAWINGS

The invention will now be explained in greater detail on the basis of examples of embodiments illustrated in the drawing, the figures of which show as follows.

DETAILED DISCUSSION IN CONJUNCTION WITH THE DRAWINGS

Figure 1:
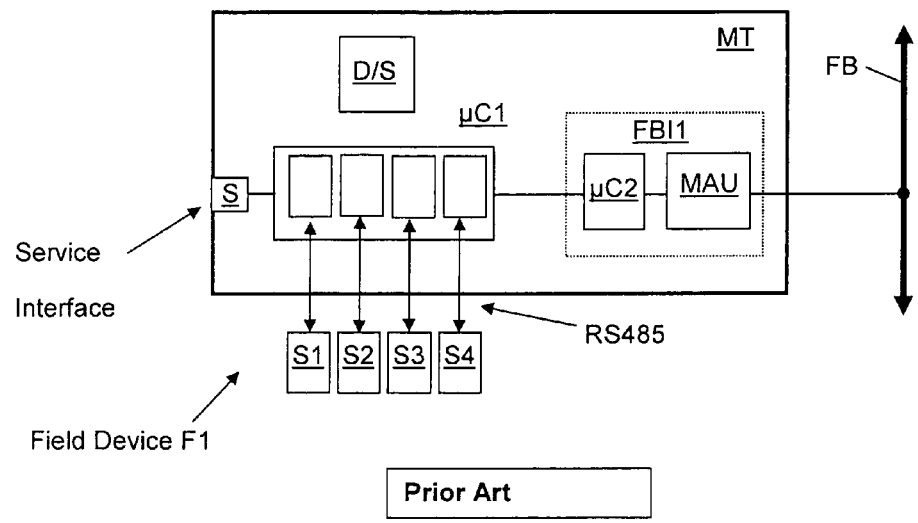
FIG. 1 a conventional field device of process automation technology.

The field device F1 shown in FIG. 1 is composed essentially of a measurement transmitter MT, to which four sensors S1-S4 are connected. These sensors are two pH-sensors, a conductivity sensor CS and an oxygen sensor Ox. These sensors serve for registering the corresponding process variables, pH-value, conductivity value and oxygen content.

The sensors S1-S4 are each connected with a microcontroller μC1, which serves for processing the measured values The measured value processing takes place in corresponding program modules in the microcontroller μC1. These program modules, together with the sensors S1-S4, form measurement channels. The field device F1 has, thus, four measurement channels.

Communication between the sensors S1-S4 and the microcontroller μC1 occurs digitally via an RS485-connection. In each of the sensors S1-S4, essentially, the corresponding process variable is digitized, while actual measured value processing takes place in the program modules in the microcontroller μC1.

Serving for display of the measured values and for parameter selection and parameter input, respectively, is a display/service unit D/S, which is likewise connected with the microcontroller μC1. The microcontroller μC1 is connected via a fieldbus interface FBI1 with a fieldbus FB (e.g. HART, Profibus, Foundation Fieldbus). The fieldbus interface FBI1 is composed essentially of a communication controller μC2 and a fieldbus adapter MAU (medium attach unit). The fieldbus adapter MAU can be, for example, the SIM1 chip of the firm, Siemens. In the communication controller μC2, essentially, the protocol matching to the relevant fieldbus system (HART, Profibus, Foundation Fieldbus) takes place.

For direct access, the measurement transmitter MT includes, supplementally, a service interface S, which is likewise connected with the microcontroller μC1. The field device F1 can be, in principle, the measuring system, Liquiline, Memosens of the firm, Endress+Hauser.

The fieldbus interface FBI1 is designed for exactly one fieldbus address. Incoming fieldbus telegrams are analyzed in the fieldbus interface, especially in the communication controller μC2, toward the goal of determining whether they have the fieldbus address of the field device F1. If this is the case, then the useful data in the fieldbus telegram are intended for the field device F1 and are forwarded to a processing program running in the microcontroller μC1. The useful data can involve, for example, a read, or write, request for data of the measurement transmitter MT, or the sensors S1-S4. In the case of a read request, the corresponding data are provided by the processing program and transferred to the communication controller μC2. The communication controller μC2 packages the requested data in a corresponding fieldbus telegram, wherein, as sender address, the fieldbus.address of the field device F1 is given. The receiver of the fieldbus telegram knows, thus, the origin of the data.

The field device can be serviced with the assistance of a service unit, e.g. a laptop computer, on which the program FieldCare of the firm, Endress+Hauser, is installed. For this, a device description developed for the particular sensor combination (2×pH, 1×CS, 1×Ox) is necessary.

The field device F1 appears as a fieldbus participant on the service unit.

If the user replaces one of the sensors S1-S4 with a sensor for another process variable, then another device description is required, which, in given circumstances, must be requested from the field device manufacturer. The field device F1 can only be accessed via the one fieldbus address.

Figure 2:
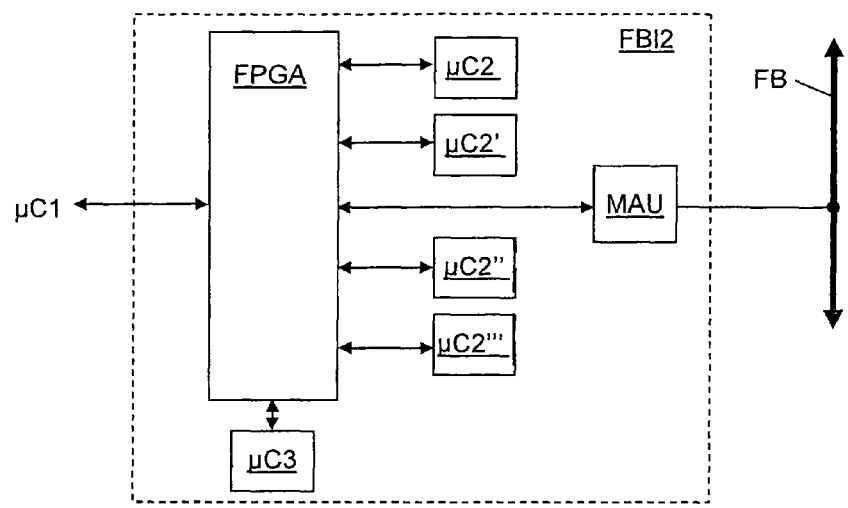
FIG. 2 a fieldbus interface for a field device of the invention.

FIG. 2 shows another fieldbus interface for the field device F1. If this fieldbus interface, referred to as FBI2, is placed in the field device F1, then field device F1 becomes a field device of the invention (in the following referred to as field device F1'), which also is suitable for the method of the invention.

Fieldbus interface FBI2 includes a fieldbus adapter MAU, like the fieldbus interface FBI1 shown in FIG. 1. Fieldbus adapter MAU is connected with a configurable logic chip e.g. an FPGA (field programmable gate array). Connected to the logic chip FPGA are four communication controllers μC2, μC2', μC2" and μC2'". Each of these communication controllers corresponds essentially to the communication controller μC2 illustrated in FIG. 1.

Furthermore, the programmable logic chip FPGA is connected with a microcontroller μC3, which cares for various control tasks.

Moreover, the programmable logic chip FPGA includes a connection to microcontroller μC1. The fieldbus interface FBI2 can thus be applied instead of the fieldbus interface FBI1 shown in FIG. 1.

The operation of this fieldbus interface FBI2 will now be explained in greater detail. Incoming fieldbus telegrams are, in each case, analyzed in the communication controllers μC2-μC2'". Each of these communication controllers has a separate fieldbus address. If one of the communication controllers μC2 to μC2''' establishes that the destination address contained in the fieldbus telegram matches its own fieldbus address, then this communication controller forwards the useful data via the logic chip FPGA to the microcontroller μC1. Corresponding response telegrams are, in each case, processed via the same communication controller and then sent via the fieldbus adapter MAU over the fieldbus FB.

Therewith, the field device F1' having the fieldbus interface FBI2 appears in the case of a bus scan as four different (logical) field devices.

Figure 3:
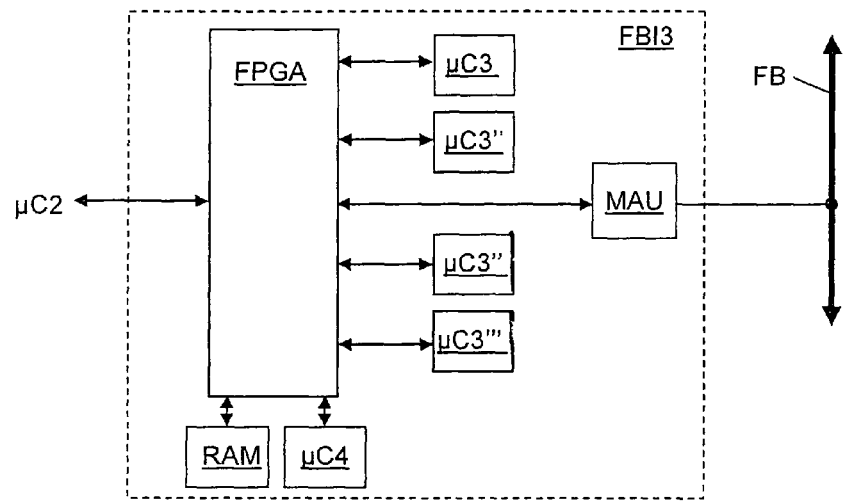
FIG. 3 an alternative embodiment of the fieldbus interface of FIG. 2.

FIG. 3 shows an alternative embodiment of the fieldbus interface FBI2 in greater detail. This fieldbus interface FBI3 includes, in contrast with the fieldbus interface FBI2, four "light" versions of the communication controllers μC2-μC2'''. These "light" communication controllers are referred to as μC3-μC3'''. The functionality no longer available in these communication controllers has been shifted into a communication controller μC4, which is likewise connected with the logic chip FPGA. Furthermore, logic chip FPGA is connected with a memory RAM.

In an alternative embodiment (not shown) of the invention, the communication controllers μC2-μC2''' are implemented by way of software in one communication controller.

In an alternative embodiment (not shown) of the fieldbus interface FBI2, such is embodied only of the fieldbus adapter MAU, a powerful, reconfigurable, logic chip FPGA, in which the communication controllers μC2-μC2''', or the communication main controller, are implemented.

The code necessary for the configuring logic chip FPGA is created in a hardware description language, e.g. VHDL.

The invention will now be explained yet again in greater detail.

For each measurement channel in the field device, the field device manufacturer creates an individual device description. For servicing the field device F1', the user can invoke the four measurement channels separately via the corresponding device descriptions. On the service unit, the field device F1' appears as four different field devices, thus as four separate, logical units.

For the user, therefore, the servicing is significantly simpler and clearer.

The field device manufacturers must, in this case, make available only three different device descriptions, in order to be able to cover all possible sensor combinations. In this way, the development of the device descriptions required for the servicing is significantly simplified.

If the user replaces one of the sensors S1-S4, then no new device description is required for the service unit.

The servicing of the field device F1'is not only possible via the fieldbus FB but, instead, also via the service interface S.

The invention claimed is:

1. A method for servicing a multi-channel field device of process automation technology, wherein: the field device comprises a measurement transmitter and has at least two measurement channels, an external service unit; each measurement channel has a sensor for registering a process variable and a program module running in a microcontroller for measured value processing, and, for connection to a fieldbus, a single fieldbus interface, which is connected with said microcontroller; a communication between said sensors and said microcontroller occurs digitally via an RS485-connection; and said fieldbus interface has at least two communication controllers which have different fieldbus addresses, the method comprising the steps of:

providing in the service unit, separate device descriptions for the measurement channels; and invoking the individual measurement channels in the service unit via the corresponding device descriptions as logical units, so that, in the servicing, the field device appears to the user as at least two logically independent field devices.

2. The method as claimed in claim 1, wherein:
device descriptions are according to one of the fieldbus standards, HART, Profibus or Foundation Fieldbus or DTMs (device type manager) according to the FDT standard.

3. The method as claimed in claim 2, wherein:
the field device is connected with the service unit via a fieldbus.

4. The method as claimed in claim 3, wherein:
in the case of a bus scan for ascertaining fieldbus participants connected with the fieldbus, each measurement channel of the field device appears on the service unit as a separate field device.

5. The method as claimed in claim 2, wherein:
the field device is connected with the service unit via a service interface provided on the field device.

6. A multi-channel field device of process automation technology, comprising:

a measurement transmitter and at least two measurement channels, each measurement channel having a sensor for registering a process variable and a program module running in a microcontroller μC1 for measured value processing, wherein a communication between said sensors and said microcontroller occurs digitally via an RS485-connection; and, a single fieldbus interface for connection to a fieldbus, which is connected with the microcontroller μC1, wherein:

said single fieldbus interface has at least two communication controllers μC2; μC2', which have different fieldbus addresses; and each communication controller μC2; μC2' exchanges data with one measurement channel.

7. The multi-channel field device as claimed in claim 6, wherein:
said at least two communication controllers μC2; μC2' are implemented by way of software in a single, communication main controller.

8. The multi-channel field device as claimed in claim 6, wherein:
said single fieldbus interface has a configurable logic chip, on which the communication main controller, or the communication controllers μC2; μC2', is/are implemented.

* * * * *